United States Patent [19]

Sweeny

[11] Patent Number: 4,785,038

[45] Date of Patent: Nov. 15, 1988

[54] SOLVENT SYSTEM FOR DIFFICULTLY SOLUBLE POLYMERS

[75] Inventor: Wilfred Sweeny, Wilmington, Del.

[73] Assignee: E. I. Du Pont de Nemours and Company, Wilmington, Del.

[21] Appl. No.: 78,193

[22] Filed: Jul. 27, 1987

[51] Int. Cl.$^4$ .......................... C08K 5/45; C08K 5/41; C08K 75/02; C08K 77/10

[52] U.S. Cl. ....................................... 524/173; 524/84; 524/386; 524/391; 524/589; 524/606; 524/608

[58] Field of Search ................. 524/173, 84, 589, 606, 524/608

[56] References Cited

U.S. PATENT DOCUMENTS

| | | | |
|---|---|---|---|
| 4,179,423 | 12/1979 | Langanis | 524/173 |
| 4,321,182 | 3/1982 | Davitt | 524/173 |
| 4,525,507 | 6/1985 | Chaker | 524/173 |

FOREIGN PATENT DOCUMENTS

| | | | |
|---|---|---|---|
| 651650 | 11/1962 | Canada | 524/173 |
| 55-116727 | 9/1980 | Japan . | |
| 57-195136 | 11/1982 | Japan . | |
| 58-7426 | 1/1983 | Japan . | |
| 59-223752 | 12/1984 | Japan . | |

OTHER PUBLICATIONS

Chalmers, "Dimethyl Sulphoxide", Paint Manufac., Feb. 1966, pp. 36–40.
J. of Applied Science, vol. 32, 6299–6315 (1986).
J. Polm. Sci., Polym. Chem. Ed., 19, 1133–1145 (1981).

*Primary Examiner*—C. Warren Ivy

[57] ABSTRACT

Difficultly soluble aromatic polyamides, polybenzimidazoles and polyureas dissolve in a defined mixture of liquid sulfoxide, a base and an alcohol or water.

7 Claims, No Drawings

SOLVENT SYSTEM FOR DIFFICULTLY SOLUBLE POLYMERS

BACKGROUND OF THE INVENTION

Para-aramid polymers are notoriously difficult to dissolve and that difficulty has led to somewhat delayed development of uses for extremely useful polymeric materials. To the present time, for example, poly(paraphenylene terephthalamide) has been spun in a solution of sulfuric acid because a solvent system having the solvent strength of sulfuric acid has been required to make the solution. There now has been discovered a solvent system with adequate solvent strength to yield relatively concentrated solutions of polymers, such as poly(para-phenylene terephthalamide) (PPD-T).

It is well known in the literature that sodium hydride reacts with dimethylsulfoxide under anhydrous condition with evolution of hydrogen to provide the so-called "dimsyl" anion. Addition of proton donors such as water and alcohols reverse the process with regeneration of the original dimethylsulfoxide. The dimsyl anion can be used to remove protons from a variety of compounds such as amines, amides, acetylenes and weakly acid hydrocarbons. Typical reactions have been described by Corey and Chaykovsky (J. Am. Chem. Soc., 87, 1345-1353, 1965), among others. Takayanagi and Katayosi have extended the reaction of the dimsyl anion with amides to relatively low molecular weight polyamides and have used the amide anion thus formed to produce a variety of N-substituted products. J. Poly. Sci. (Polymer Chemistry Edition) 19, 1133 (1981).

SUMMARY OF THE INVENTION

This invention provides a clear solution of a polymer containing the —NH— group selected from the group of aromatic polyamides, aromatic polybenzimidazoles and aromatic polyureas in a solvent comprising the admixture of (a) a base selected from the group of potassium or sodium alkoxides, hydroxides or hydrides, (b) a liquid sulfoxide and (c) water or an aliphatic alcohol of up to eight carbon atoms, said base being present in the range of from 0.4 to 1.6 moles per mole of —NH— in the polymer, said alcohol being present in the range of from 1 to 5 moles per mole of potassium base, and in the range of from 1 to 1.5 moles per mole of sodium base or, if water is employed, it is present in the range of from 0.5 to 2.5 moles per mole of potassium base and in the range of from 0.5 to 0.75 moles per mole of sodium base and the liquid sulfoxide being present in an amount sufficient to effect solution.

DETAILED DESCRIPTION OF THE INVENTION

The solvent system of the present invention includes a solvent, a base, and an alcohol. All of these are necessary for good solution of the polymer types specified containing —NH— functions. Suitable bases promote solubility. This function is shared with the sulfoxide solvent which is known to enhance the basicity of alkoxides. (See Steiner and Gilbert, J. Am. Chem. Soc., 3054, (1963); also DMSO Review, Crown Zellerbach, Chemical Products Division, Vancouver, Wash. 98662). The alcohol is considered very important to the operation of this invention because it enhances the solubilization of the polymer, reducing solution viscosity and permitting attainment of solutions of higher concentration. Although the function of the alcohol has not been fully determined, it appears to affect the complex equilibrium of ions associated with the polymer and solvates the cation.

Liquid sulfoxides have been found useful as solvents in the practice of this invention. Those most used have a general structure which includes the following:

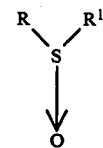

where R and $R^1$, which may be the same or different, are alkyl of three or less carbon atoms, and may be combined with the sulfoxide group to form a cyclo aliphatic ring. Preferred are dimethylsulfoxide (DMSO) and tetrahydrothiophene oxide (THTO). Other commonly used polymer solvents such as dimethylacetamide, tetramethylurea, dimethylpyrrolidinone, N-methylpyrrolidone have been found to be ineffective as solvents in the system of this invention.

Bases which have been found to be useful in the practice of this invention are potassium and sodium alkoxides of less than five carbon atoms, hydroxides, hydrides and the dimsyl product derived from DMSO and sodium or potassium hydride. Preferred bases are those derived from potassium, particularly potassium t-butoxide and hydroxide. Hydrides have been found effective to the extent that the hydride is converted to a hydroxide or alkoxide by addition of an alcohol in establishment of the solvent system. The use of an unreacted hydride compound, as a hydride compound, is not believed to contribute to the solvent system of this invention.

The alcohols which have been found useful in the practice of this invention are primary and secondary aliphatic alcohols, alkylene diols and alkanolamines having less than nine carbon atoms. Illustrative thereof are methanol, ethanol, benzyl alcohol, ethanolamine, glycol, etc. Water is also useful although water is not preferred.

The polymers that are effectively dissolved by the solvent system of this invention are aromatic polyamides, aromatic polybenzimidazoles and aromatic polyureas containing the —NH— function as part of the polymer unit. Contemplated herein are polymers having at least a film-forming molecular weight. The polymers specified above are difficultly soluble in other solvent systems. Aromatic polybenzimidazoles useful in this invention are described in U.S. Pat. No. 3,551,389, useful aromatic polyamides are described in U.S. Pat. Nos. 3,869,429 and 4,075,172, while useful aromatic polyureas are exemplified in U.S. Pat. No. 3,418,275 and in other prior art. The polymers should have an inherent viscosity greater than 0.4 measured at 0.5% concentration in concentrated (95-98%) sulfuric acid at 30° C. Among such polymers can be listed poly(paraphenylene terephthalamide), poly(metaphenylene isophthalamide), poly(parabenzamide), poly(4,4'-biphenylene isophthalamide), poly(chloroparaphenylene isophthalamide), polybenzimidazole from 3,4,3',4'-tetraaminobiphenyl and isophthalic acid, and the polybenzimidazole from 3,4-diaminobenzoic acid. It is believed that aromatic polyamides, polybenzimidazoles and polyureas containing an —NH— in the structural unit of the polymer are generally soluble in the solvent system of this invention. It has been found that aliphatic polyamides, such as those from caprolactam and hexamethylene dodecanediamide, and poly-ketones, such as from hydroquinone and 4,4'-difluoro-benzophenone are not dissolved by the system of this invention.

To prepare solutions of polymer using the instant solvent system, it is necessary only to expose or immerse the polymer in the combination of components which are used in the solvent system. The order of addition is not critical although the solvent system is usually completely made up before immersion of the polymer to be dissolved. It would be possible and acceptable, however, to, for example, disperse the polymer to be dissolved in the solvent component and then add to that dispersion a solution of the base and the alcohol.

The solutions are preferably prepared at temperatures less than 50° C. since prolonged exposure at higher temperatures may result in reduction in molecular weight. The degree of degradation, of course, depends on polymer structure, but little degradation of poly(-paraphenylene terephthalamide) has been observed on prolonged storage at ambient temperatures.

The amount of polymer which can be dissolved by the instant solvent system is strictly a function of ability to handle the generated solution viscosity. Extended chain polymers, such as poly(paraphenylene terephthalamide) provide significantly higher solution viscosities at the same concentration and molecular weight than flexible chain polymers, such as poly(metaphenylene isophthalamide). Concentrations of polymer attainable in the solutions will vary with the molecular weight as determined by inherent viscosity. With poly(paraphenylene terephthalamide), 15% solutions have been prepared from polymer having an inherent viscosity of 1.4 while 6% solutions have been prepared from polymer having an inherent viscosity of 5.7.

While the ratios of solvent system components are selected to fit the characteristics of the individual components, there are preferred recommendations. Ordinarily from 0.4 to 1.6 moles of base per mole of —NH— group in the polymer is employed with a 1:1 ratio preferred for maximum solubility. The proportion of alcohol that is used will depend on the base and/or solution concentration of polymer. Thus, for a desired level of solubility, one should employ from 1 to 5 moles of alcohol and preferably 3 to 4 moles of alcohol per mole of potassium base. On the other hand, only 1 to 1.5 moles of alcohol should be employed when using a sodium base and half the moles of water as alcohol is needed for equivalent of base. A higher concentration of polymer is tolerated with lower molecular weight alcohol. Finally, the liquid sulfoxide should be present in an amount sufficient to effect solution. Dissolution of the polymer is generally not instantaneous. The higher the molecular weight, the longer it will take to dissolve.

DESCRIPTION OF THE PREFERRED EMBODIMENTS

"Inherent viscosity", as referred to in the following example, is computed as the natural logarithm of the solution-to-solvent ratio of flow times at 25° C. all divided by 0.5, wherein the solvent is concentrated (95-98 wgt. %) sulfuric acid and the solution is of 0.5 grams of polymer per 100 dL of solvent.

EXAMPLE 1

In this example, there is a simle description of the preparation of a low concentration solution of poly(-para-phenylene terephthalamide) (PPD-T). Five weight parts of PPD-T having an inherent viscosity of 6.3 were added to a system of 165 weight parts (150 volume parts) dimethylsulfoxide (DMSO) containing 2 weight parts 50% sodium hydride in oil. Because it remained a swollen gel, another 55 weight parts (50 volume parts) of DMSO and another 2 weight parts of 50% NaH in oil were added. After stirring for three hours at about 20° C., the polymer was swollen and gel-like but undissolved. Methanol was added to the system in the amount of 15.8 weight parts (20 volume parts); and, after stirring at about 20° C. for an additional 30 minutes, the PPD-T dissolved to a clear, deep red solution. The solution was about 2.1 weight % PPD-T polymer.

EXAMPE 2

In this example, there is another simple description of the preparation of a low concentration solution of PPD-T. Five weight parts of PPD-T having an inherent viscosity of 5.6 were added to a system of 165 weight parts (150 volume parts) DMSO containing 10 weight part potassium t-butoxide. After stirring for 30 minutes at about 20° C., the polymer was swollen and gel-like but undissolved. Methanol was added to the system in the amount of 7.9 weight parts (10 volume parts); and, after stirring at about 20° C. for an additional 90 minutes, the PPD-T dissolved to a clear, deep red solution. The solution was about 2.7 weight % PPD-T polymer.

EXAMPLE 3

This example was run to determine how much base is needed per mole of PPD-T polymer in fiber form to effect solution. Previously it was determined that the most effective alcohol/base ratio using methanol/potassium t-butoxide was roughly 3.5/1, i.e., equal weights of both components. Thus, 3 g. potassium t-butoxide (KOBu) was dissolved in 3 g. methanol and used in the following experiments. In each instance, 10 g. of DMSO was employed.

| RUN | KOBµ SOLUTION g. | POLYMER | MOLES KOBµ/ POLYMER* | SOLUBILITY** |
|---|---|---|---|---|
| 1 | 0.15 | 0.5 | 0.16 | 40–50 |
| 2 | 0.29 | 0.5 | 0.31 | 50–60 |
| 3 | 0.59 | 0.5 | 0.63 | 80 |
| 4 | 0.76 | 0.5 | 0.81 | 90 |
| 5 | 1.10 | 0.5 | 1.17 | 100 |
| 6 | 1.35 | 0.5 | 1.44 | 100 |

*per amide unit
**arbitrary scale: 0 = totally insoluble; 50 = highly swollen/part soluble; 100 = totally soluble. Results judged after 4 hours.

The above results indicate that approx. 1 mole base per amide (or acidic) hydrogen is required for optimum solubility.

EXAMPLE 4

In this example, two series of experiments were conducted to demonstrate a range of useful concentrations of base, alcohol, and solvent in the present solvent systems. In the first series, 0.5 weight parts (0.0045 moles) of potassium t-butoxide was added to 10 weight parts DMSO along with six different levels of methanol, namely, 0.25, 0.5, 1.0, 1.5, 2.0 and 2.5 weight parts (0.008–0.08 moles), to form six different solvent systems. In the second series, 1.0 weight parts (0.009 moles) of the potassium t-butoxide was used with 10 weight parts (0.128 moles) of DMSO along with the same six different levels of methanol to form six additional solvent systems.

To each of the twelve solvent systems was added 0.5 weight parts (0.004 moles —NH—) of PPD-T having an inherent viscosity of about 5.6. Each of the systems was stirred and then left for 24 hours at about 20° C. Using an arbitrary scale with 100 being complete solution and 0 being no solution or swelling, a visual assessment was made of the degree of dissolution of the PPD-T in each of the systems. The results of the assessment are listed in TABLE I below:

TABLE I

| Methanol | | Series 1 | Series 2 |
| --- | --- | --- | --- |
| Wt. Parts | Moles | Solubility | Solubility |
| 0.25 | 0.0078 | 90 | 10 |
| 0.50 | 0.0156 | 100 | 30 |
| 1.00 | 0.0312 | 80 | 100 |
| 1.50 | 0.00468 | 30 | 90 |
| 2.00 | 0.0624 | 0 | 70 |
| 2.50 | 0.0780 | 0 | 50 |

EXAMPLE 5

COMPARISON OF VARIOUS ALCOHOLS AS COSOLVENTS WITH PPD-T POLYMER

In a series of vials was put: 10 g DMSO, 0.5 g (0.0045 moles) potassium t-butoxide, and an alcohol (as indicated below) in the proportion of three moles/mole of potassium t-butoxide used. To the solutions were then added 0.5 g dried PPD-T fiber. The fiber inherent viscosity was ~5.7. The vials were left at ambient temperature for 24 hours, with occasional stirring, and then the polymer solubility was assessed, based on solution clarity (absence of undissolved polymer) and uniform flow characteristics. An arbitrary scale of 1–10 was used with 10=clear solution that flowed smoothly; 5=considerable swelling and pasty but poor solution characteristics; 1=no swelling. Results are shown below:

| ALCOHOL | RATING |
| --- | --- |
| Methanol | 10 |
| Ethanol | 10 |
| Butanol | 10 |
| Isopropanol | 8 |
| Glycol | 9 |
| Butanediol | 9 |
| Benzyl | 10 |
| t-Butanol | 5 |
| Cresol | 1 |
| None | 2 |

The conclusion was that the primary and secondary alcohols gave good solutions of PPD-T at the above concentration level.

The above experiment was repeated with methanol, ethanol and benzyl alcohols at the same concentration but using the same molar equivalent of sodium methoxide instead of potassium t-butoxide (i.e., 0.24 g sodium methoxide). The corresponding results are shown below:

| ALCOHOL | RATING |
| --- | --- |
| Methanol | 4 |
| Ethanol | 4 |
| Benzyl | 5 |

The sodium alkoxide with alcohol cosolvent is slightly better than the control but inferior to the corresponding potassium alkoxide.

EXAMPLE 6

In this example, a series of experiments were conducted to demonstrate a variety of bases which can be used in the present solvent systems. Into each of several vials was placed 0.75 weight parts of methanol as the alcohol and 10 weight parts DMSO as the solvent. The following bases were then added to the vials—one base to each vial, in the amount of 0.5 weight parts: sodium methoxide, sodium hydroxide, potassium hydroxide, N-methyl pyrrolidine, and lithium t-butoxide to complete the solvent systems.

To each of the solvent systems was added 0.5 weight parts of PPD-T having an inherent viscosity of about 5.6. Each of the systems was stirred and then left for 24 hours at about 20° C. Sodium methoxide, sodium hydroxide, and potassium hydroxide were the only bases tested in this example which resulted in solutions.

EXAMPLE 7

In this example, solvent was used which was different from DMSO of the previous examples. Tetrahydrothiophene oxide (THTO), as the solvent, was purified by distillation to a b.p. 75° C. at 2 mm Hg. Into three separate vials were charged:

(1) 10 weight parts THTO and 0.3 weight parts PPD-T having an inherent viscosity of 6.3;

(2) 10 weight parts THTO, 0.3 weight parts PPD-T, and 0.8 weight parts methanol; and (3) 10 weight parts THTO, 0.3 weight parts PPD-T, 0.8 weight parts methanol, and 0.5 weight parts potassium t-butoxide.

The vials were shaken and then left for 24 hours at about 20° C. The system in vial number three resulted in a solution. There was no solution in either of the other two vials.

A film was cast with the solution from vial number three using an 0.003 inch doctor knife. The cast solution was quenched and soaked in methanol containing 5 weight % acetic acid for one hour, and was dried at about 80° C. The resulting film was clear and tough.

Other materials were tested under conditions similar to those set out above and were found to be ineffective as solvents in the present solvent systems. Those materials included: N-methylpyrrolidone, tetramethylene urea, dimethylimidazolidinone, dimethylacetamide, diethylacetamide, tetrahydrofuran, and tetramethylene sulfone.

EXAMPLE 8

In this example, polymers other than PPD-T were dissolved by the solvent system. Into three separate vials were charged:

(1) 10 weight parts DMSO and 0.1 weight part polybenzimidazole having an inherent viscosity of 0.8;

(2) 10 weight parts DMSO, 0.5 weight part potassium t-butoxide, and 0.1 weight part of the polybenzimidazole;

(3) 10 weight parts DMSO, 0.5 weight part potassium t-butoxide, 1 weight part methanol, and 0.1 weight part of the polybenzimidazole.

The vials were shaken and then left for 24 hours at about 20° C. The system in vial number three resulted in a solution. The polymer was somewhat swollen in vial number two, but it was not dissolved. The polymer was not swollen or dissolved in the other vial.

A standard solution was made consisting of 1.12 g. potassium t-butoxide, 0.96 g. methanol and 20 g. DMSO. This was used in the experiments below. A like solution was made up, as control, but excluding the methanol. The polymers indicated below were tested as described above with these solutions in the proportion of 1 mole base for each mole of polymer containing 1 mole —NH—.

| Polymer | g. | Moles/—NH— Group | Base Solutions g. | Moles | Control Solution Without Meth. | W/Methanol |
|---|---|---|---|---|---|---|
| 5-chloro-para-phenyleneiso-phthalamide | 0.136 | 0.001 | 2.2 | 0.001 | Clear Solution | Clear Solution |
| 1,4-Benzamide | 0.238 | 0.002 | 4.4 | 0.002 | Insoluble | Soluble |
| 4,4'-Biphenyl-ene-tereph-thalamide | 0.08 | 0.0005 | 1.2 | 0.0005 | Insoluble | Soluble |
| 2,2'-dichloro-biphenylene-isophthalamide | 0.38 | 0.002 | 4.4 | 0.002 | Lumpy (incomplete solution) | Soluble |
| Metaphenylene-4-chloroiso-phthalamide | 0.078 | 0.0006 | 1.2 | 0.0005 | Soluble | Soluble |

EXAMPLE 9

In this example, a series of experiments was conducted to demonstrate applicability of the present invention to aromatic polyureas. In the first vial (A) was added 10 g DMSO, 1.12 g potassium t-butoxide, and 0.74 g methanol. To a second vial (B) was added the same ingredients but with omission of the methanol, while to a third vial (C) only the DMSO was added. A polyurea/diketopiperazine having an inherent viscosity of 0.45 and the formula

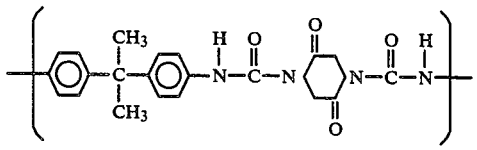

was prepared from diaminodiphenylmethane diisocyanate and diketopiperazine. To each of the vials was added 1.22 g of the polymer. The vials were kept at room temperature for one week and observed. Everything was dissolved (a red solution) in the first vial (A). Very little swelling of the polymer took place in the second vial (B) and no solution was observed. In the third vial (C), the polymer was not even swollen. The polymer in vial (A) was actually in solution after only a few hours.

EXAMPLE 10

In this example, a fiber was spun from a solution of the present invention. A spinning dope was prepared by making a solution of 60 weight parts of DMSO, 2 weight parts of potassium t-butoxide, 2 weight parts of methanol, and 2 weight parts of PPD-T having an inherent viscosity of 5.7. The resulting deep red solution was spun from a single hole 0.25 mm in diameter into a coagulating bath of methanol with 5 weight % acetic acid. The coagulating bath was 50 centimeters long, the dope throughput was 1–3 ml per minute, and the fiber wind-up speed was 8–9.5 meters per minute. The wound fiber was soaked overnight in methanol with 5 weight % acetic acid and was then soaked in acetone for one hour. The fiber was heated for 20 seconds at 370° C. under no tension and exhibited the following properties: tenacity (gpd)/ elongation (%)/modulus (gpd) was 3.5/3/144. Examples of fiber from other spins after annealing at 500° C. had tenacity/elongation/modulus =5.6/2/340.

EXAMPLE 11

In this example, a fiber was spun from a solution of the present invention. A spinning dope was prepared by making a solution of 120 weight parts of DMSO, 40 weight parts of potassium t-butoxide, 40 weight parts of methanol, and 40 weight parts of poly(metaphenylene isophthalamide) having an inherent viscosity of 1.6. The resulting light yellow solution was air gap spun to form useful fibers, which after drawing sequentially at 120° C. and 295° C. with a total draw of 3.5–5 X had a tenacity/elongation/modulus of 4.4 gpd/14%/103 gpd.

I claim:

1. A clear solution of a polymer containing the —NH— group selected from the group of aromatic polyamides, aromatic polybenzimidazoles and aromatic polyureas in a solvent comprising the admixture of (a) a base selected from the group of potassium or sodium alkoxides, hydroxides or hydrides, (b) a liquid sulfoxide, and (c) water or an aliphatic alcohol of up to eight carbon atoms, said base being present in the range of from 0.4 to 1.6 moles per mole of —NH— in the polymer, said alcohol being present in the range of from 1 to 5 moles per mole of potassium base, and in the range of from 1 to 1.5 moles per mole of sodium base or, if water is employed, it is present in the range of from 0.5 to 2.5 moles per mole of potassium base and in the range of from 0.5 to 0.75 moles per mole of sodium base and the liquid sulfoxide being present in an amount sufficient to effect solution.

2. The solution of claim 1 wherein the polymer is an aromatic polyamide.

3. The solution of claim 1 wherein the polymer is an aromatic polybenzimidazole.

4. The solution of claim 1 wherein the polymer is an aromatic polyurea.

5. The solution of claim 1 wherein the liquid sulfoxide is dimethylsulfoxide.

6. The solution of claim 5 wherein the base is potassium t-butoxide.

7. The solution of claim 1 wherein the alcohol is methanol.